United States Patent
Göransson et al.

(10) Patent No.: US 8,036,602 B2
(45) Date of Patent: Oct. 11, 2011

(54) APPARATUS AND METHODS FOR PROVIDING FUNCTION SPECIFIC ACCESS TO A MOBILE TERMINAL VIA AN EXTERNAL DEVICE

(75) Inventors: Magnus Göransson, Svedala (SE); Alexander Sjöstedt, Malmö (SE); Tina Lekeberg, Malmö (SE); Matthias Kierysch, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 423 days.

(21) Appl. No.: 12/414,135

(22) Filed: Mar. 30, 2009

(65) Prior Publication Data

US 2010/0248626 A1 Sep. 30, 2010

(51) Int. Cl.
*H04Q 7/20* (2006.01)
(52) U.S. Cl. .......................................... 455/68; 455/522
(58) Field of Classification Search .............. 455/68–70, 455/432, 433, 517, 522; 375/346–351
See application file for complete search history.

(56) References Cited

U.S. PATENT DOCUMENTS

| 7,483,676 B2 * | 1/2009 | Mizukami et al. .............. 455/68 |
| 2003/0080996 A1 | 5/2003 | Lavin et al. |
| 2006/0058018 A1 | 3/2006 | Toulis et al. |
| 2007/0080934 A1 | 4/2007 | Chen et al. |
| 2007/0281614 A1 * | 12/2007 | Oliver et al. ................. 455/41.2 |
| 2008/0014989 A1 | 1/2008 | Sandegard et al. |
| 2008/0248757 A1 * | 10/2008 | Brekelmans ..................... 455/68 |
| 2009/0111380 A1 * | 4/2009 | Lee et al. ..................... 455/41.3 |
| 2010/0248642 A1 * | 9/2010 | Howard et al. ................. 455/68 |

FOREIGN PATENT DOCUMENTS

| EP | 1 672 888 A1 | 6/2006 |
| WO | WO 2005/043874 A1 | 5/2005 |

OTHER PUBLICATIONS

International Search Report and Written Opinion, PCT International Application No. PCT/IB2009/054438, Jan. 14, 2010.

* cited by examiner

*Primary Examiner* — Henry Choe
(74) *Attorney, Agent, or Firm* — Myers Bigel Sibley & Sajovec

(57) ABSTRACT

Methods, systems, and apparatus for providing customizable interaction with a mobile terminal using external input devices are provided. A first activation signal that corresponds to a first function in the mobile terminal is received into the mobile terminal from a first external input device of the plurality of input devices that is configured to receive a first activating input from a user. The first function is activated in the mobile terminal responsive to receiving the first activation signal. A second activation signal is received into the mobile terminal from a second external input device of the plurality of external input devices that is configured to receive a second activating input from the user. The second activation signal corresponds to a second function in the mobile terminal. The second function is activated in the mobile terminal responsive to receiving the second activation signal.

20 Claims, 5 Drawing Sheets

APPARATUS AND METHODS FOR PROVIDING FUNCTION SPECIFIC ACCESS TO A MOBILE TERMINAL VIA AN EXTERNAL DEVICE

FIELD OF THE INVENTION

The present invention relates to interfaces for a mobile terminal.

BACKGROUND

As consumer preferences and improved technology results in smaller electronic devices, the space available on electronic devices for displays and keypads and other user interfaces is increasingly limited. In conjunction with the decrease in display and keyboard space, the quantity of functions in an electronic device may be increased. However, access to the increased functionality and/or ease of use may be compromised in an effort to decrease the size of the user interface. For example, multifunctional keys can be confusing to the user and may still not provide convenient access to desired operations.

Additionally, some functions may be relied upon more frequently than other functions. Although multifunctional keys may be programmed to directly access the regularly accessed functions, this operation may be cumbersome and time consuming for a user.

SUMMARY

Some embodiments of the present invention include an apparatus for activating a first function in a mobile terminal. Embodiments of such apparatus may include a user input component that corresponds to the first function in the mobile terminal and that is configured to receive an activating input from a user. An apparatus may include a first communication component that is configured to send a first activation signal to the mobile terminal that corresponds to the first function in the mobile terminal and that causes the mobile terminal to activate the first function and a first fastening component that is configured to engage the mobile terminal and to removably attach the apparatus to the mobile terminal. An apparatus may include a second fastening component that is configured to engage a first fastening component of a second apparatus that is configured to activate a second function in the mobile terminal that is different from the first function in the mobile terminal. The second fastening apparatus may be further configured to removably attach the apparatus to the second apparatus.

Some embodiments may further provide a second apparatus that is removably attached to the first apparatus via the first and second fastening components on the first apparatus and the second apparatus, respectively and a third apparatus that is removably attached to the second apparatus via the first and second fastening components on the second apparatus and the third apparatus, respectively.

In some embodiments, the first communication component includes a conductive element that is configured to transmit an electrical signal from the apparatus to the mobile terminal. Some embodiments provide that the conductive element and the first fastening component are integrally configured and that when the first fastening component is engaged with the mobile terminal, the apparatus and the mobile terminal are conductively engaged.

Some embodiments provide that the first communication component includes a wireless communication component that is configured to wirelessly send the first activation signal to the mobile terminal that corresponds to the first function in the mobile terminal and that causes the mobile terminal to activate the first function.

Some embodiments include a second communication component that is configured to receive a second activation signal from the second apparatus that corresponds to the second function in the mobile terminal. In some embodiments, the first communication component is further configured to send the second activation signal to the mobile terminal. Some embodiments provide that the second communication component includes a conductive element that is configured to receive an electrical signal from the second apparatus. In some embodiments, the second communication component includes a wireless communication component that is configured to wirelessly receive the second activation signal from the second apparatus.

Some embodiments provide that the user input component includes a physical activator that can be engaged by a user. In some embodiments, the user input component includes a touch technology that can be actuated by positioning the apparatus in close proximity with the mobile terminal. Some embodiments include an image display component that is configured to provide a first function image that is associated with the first function.

Some embodiments of the present invention include methods of providing customizable interaction with a mobile terminal using multiple external input devices. Methods may include receiving, into the mobile terminal, a first activation signal that corresponds to a first function in the mobile terminal from a first external input device of the multiple input devices that is configured to receive a first activating input from a user and activating the first function in the mobile terminal responsive to receiving the first activation signal. Methods may include receiving, into the mobile terminal, a second activation signal that corresponds to a second function in the mobile terminal from a second external input device of the multiple external input devices that is configured to receive a second activating input from the user and activating the second function in the mobile terminal responsive to receiving the second activation signal.

Some embodiments include removably attaching the first external input device to the mobile terminal via a first mechanical connection and removably attaching the second external input device to the first external input device via a second mechanical connection. In some embodiments, the first mechanical connection includes a first communication component that is configured to transmit the first activation signal from the first external input device to the mobile terminal. Some embodiments provide that the second mechanical connection includes a second communication component that is configured to transmit the second activation signal from the second external input device to the mobile terminal via the first external input device.

In some embodiments, receiving the first activation signal includes wirelessly receiving the first activation signal from the first external input device. Some embodiments provide that receiving the second activation signal includes receiving, into the first external input device, the second activation signal from the second external input device and wirelessly receiving, into the mobile terminal, the second activation signal from the first external input device.

Some embodiments provide that receiving the second activation signal into the first external input device includes conductively receiving the second activation signal from the second external input device. In some embodiments, receiving the second activation signal into the first external input device includes wirelessly receiving, into the first external input device, the second activation signal from the second external input device.

In some embodiments, receiving the second activation signal into the mobile terminal includes wirelessly receiving, into the mobile terminal, the second activation signal from the second external input device.

Some embodiments may include receiving, into the mobile terminal, a third activation signal that corresponds to a third function in the mobile terminal from a third external input device of the multiple external devices that is configured to receive a third activating input from the user and activating the third function in the mobile terminal responsive to receiving the third activation signal.

Some embodiments of the present invention include systems for providing customizable interaction with a mobile terminal. A system may include multiple external input devices that correspond to a respective multiple functions in the mobile terminal and that are configured to transmit a respective multiple activation signals to be received by the mobile terminal. In some embodiments, the external input devices are configured to be arranged in a serial arrangement that is removably attached to the mobile terminal and are communicatively coupled to one another and/or the mobile terminal. Some embodiments provide that respective ones of the external input devices include a user input component that corresponds to a respective function in the mobile terminal and that is configured to receive an activating input from a user, a communication component that is configured to send a respective activation signal to the mobile terminal that corresponds to the respective function in the mobile terminal and that causes the mobile terminal to activate the respective function, and a first fastening component that is configured to engage the mobile terminal and/or another one of the external input devices and to removably attach the apparatus to the mobile terminal and/or the another one of the external input devices. Respective ones of the external input devices may include a second fastening component that is configured to engage a first fastening component of another one of the external input devices.

Some embodiments provide that the external input devices are configured to be arranged in a serial arrangement that is removably attached to the mobile terminal. In some embodiments, the external input devices are communicatively coupled to one another and/or the mobile terminal.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION

Figure 1:
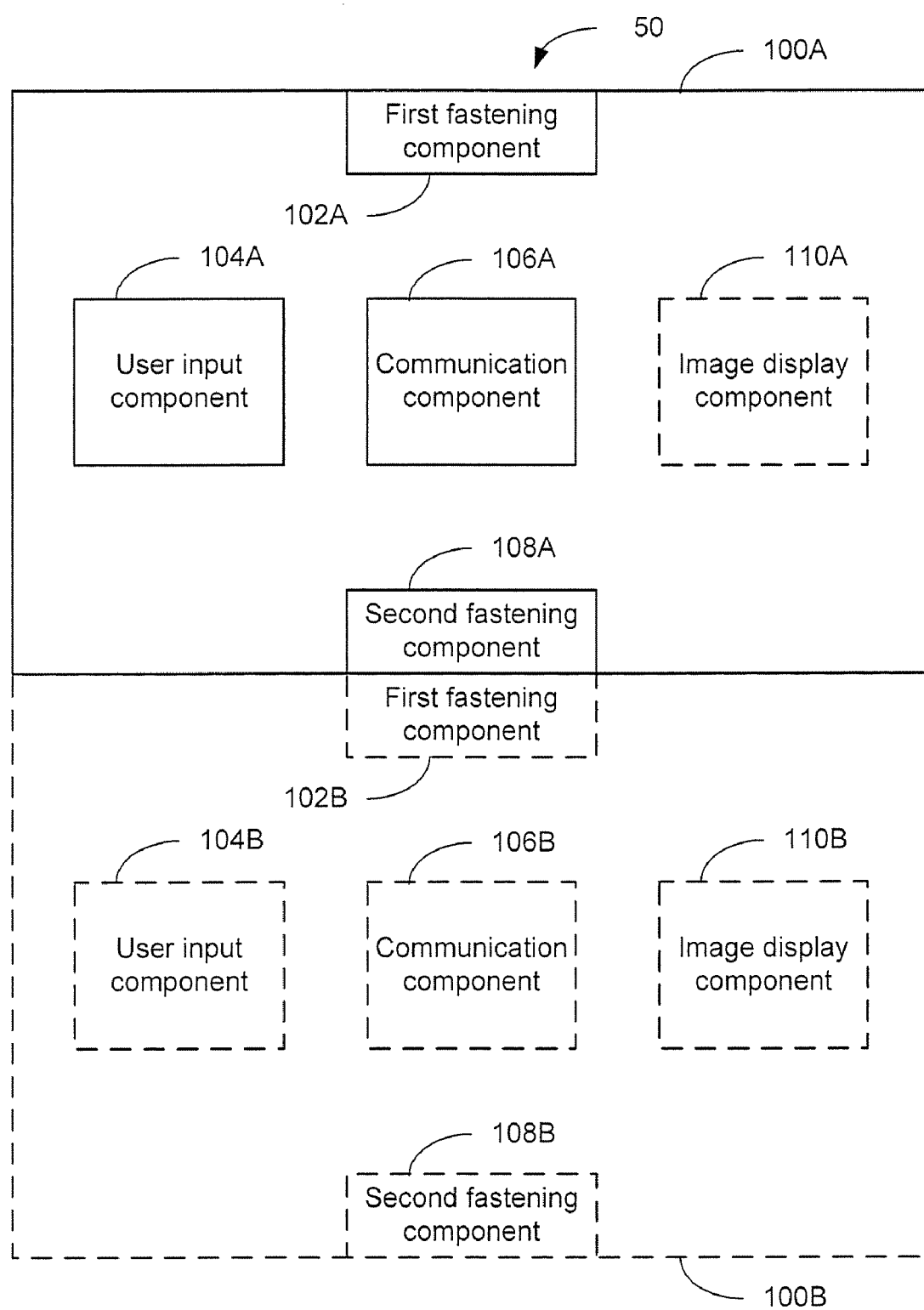
FIG. 1 is a block diagram illustrating a system for providing customizable interaction with a mobile terminal according to some embodiments of the present invention.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise. The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system.

The computer-usable or computer-readable medium may be, for example but not limited to, an electrical connection having one or more wires, a portable computer diskette, a random access memory (RAM), a read-only memory (ROM), an erasable programmable read-only memory (EPROM or Flash memory), and a portable compact disc read-only memory (CD-ROM).

As used herein, a "mobile terminal" includes, but is not limited to, a terminal that is configured to receive communication signals via a wireless interface from, for example, a cellular network, a Wide Area Network, wireless local area network (WLAN), a Bluetooth device, an RFID device and/or another RF communication device.

Reference is now made to FIG. 1, which is a block diagram illustrating a system for providing customizable interaction with a mobile terminal according to some embodiments of the present invention. The system 50 may include multiple external input devices 100A and 100B that correspond to respective functions in the mobile terminal (not shown). The external input devices 100A and 100B are configured to transmit respective activation signals to the mobile terminal. The activation signals may correspond to the respective functions in the mobile terminal. In this manner, a user may activate a specific function in the mobile terminal via the corresponding external input device 100A and 100B.

In some embodiments, the external input devices 100A and 100B may be preprogrammed for the specific functions by a manufacturer, distributor and/or retailer. Some embodiments provide that the external input devices 100A and 100B may be programmed by a user. For example, a setup application in the mobile terminal may be provided that permits specific functions to be mapped to different ones of the external input devices 100A and 100B. In some embodiments, the setup application may provided with the phone, while other embodiments may provide that the setup application is downloaded from a server, service or other processing and/or communication device.

Some embodiments provide that each of the external input devices 100 may include a user input component 104 that corresponds to the respective function in the mobile terminal. The user input component 104 is configured to receive an activating input from the user. In some embodiments, the user input component 104 may include a physical activator including, for example, a button, slide and/or switch, among others. In some embodiments, the user input component 104 may include a touch sensitive technology. Some embodiments provide that touch sensitive technologies as described herein may include capacitive, resistive, acoustic wave, strain gauge, optical imaging, dispersive signal and/or acoustic pulse, among others. In some embodiments, the user input component 104 may be configured to receive the activating input from the user by positioning a portion of the external input device 100 in proximity and/or contact with a portion of the mobile terminal.

Some embodiments provide that each of the external input devices 100 may include a communication component 104 that is configured to send an activation signal to the mobile terminal that corresponds to the respective function in the mobile terminal. The respective function may then be activated in the mobile terminal. In some embodiments, the communication component 104 may include a physical connection such as, for example, an electrically conductive element that is configured to transmit an electrical signal from the external input device 100 to the mobile terminal. Some embodiments provide that the communication component 104 may include a non-physical communication technology to provide, for example, a wireless connection to the mobile terminal. In some embodiments, a wireless connection may include inductive coupling, capacitive coupling, Bluetooth, near field communication (NFC), ultra wideband (UWB), radio frequency identification (RFID), sensor networks, and/or any other wireless technology including secure and/or non-secure protocol and short and/or long range communication, among others.

An external input device 100 may include a first fastening component 102 that is configured to engage and removably attach to the mobile terminal and/or another external input device 100. The first fastening component 102 may removably attach the external input device 100 to a mobile terminal and/or another external input device 100. For example, as illustrated in FIG. 1, the first fastening component 102A may be configured to attach to the mobile terminal. In contrast, the first fastening component 102B in the external input device 100B may be configured to removably attach to external input device 100A. In this regard, an external input device 100 may include a second fastening component 108 that is configured to engage a first fastening component 102 of a different external input device 100.

In some embodiments, the first and second fastening components 102 and 108 may be mechanically complementary relative to one another such as, for example, in screw/nut and/or socket/plug configurations. Some embodiments provide that the first and second fastening components 102 and 108 may include a clip, loop and/or lanyard connector and a hole for receiving a clip and/or lanyard connector, respectively. In some embodiments, the first and second fastening components 102 and 108 may be interlocking links that are configured to engage one another.

In some embodiments, a conductive element of the communication component 106 may be integrally configured into the first fastening component 102. In this manner, the external input device 100 and the mobile terminal may be conductively engaged when the first fastening component 102 mechanically engages the mobile terminal.

Some embodiments provide that the communication component 106A is further configured to receive an activation signal from another external input device 100B and to send the activation signal to the mobile terminal. For example, a first external input device 100A may be configured as a master and/or hub device and other external input devices (e.g., 100B) may communicate with the mobile terminal via the first external input device 100A. In some embodiments, the activation signal may be received into the first external input device 100A via a second communication component (not shown) that may be communicatively coupled to the first communication component 106A. Stated differently, the sending and receiving functions in the external input device 100 may be provided in the same or different components within the external input devices 100.

Some embodiments may include an image display component 110 that is configured to provide an image that corresponds to the function that is activated via the external input device 100. The image display component 110 may be user configurable and/or may be configured by a manufacturer, distributor, and/or retailer. In some embodiments, the image display component 110 may include a clear and/or color tinted portion behind which an image may be placed. Some embodiments provide that the image display component 110 may be integrated with the user input component 104 such that the external input device 100 the receive an activating input via user engagement with the image display component 110. In some embodiments, the image display component 110 may include graphical and/or textual content. Some embodiments provide that ones of the external input devices 100 may be provided in different colors and/or shapes to further facilitate customization and/or differentiation among multiple external input devices 100.

Figure 2A:
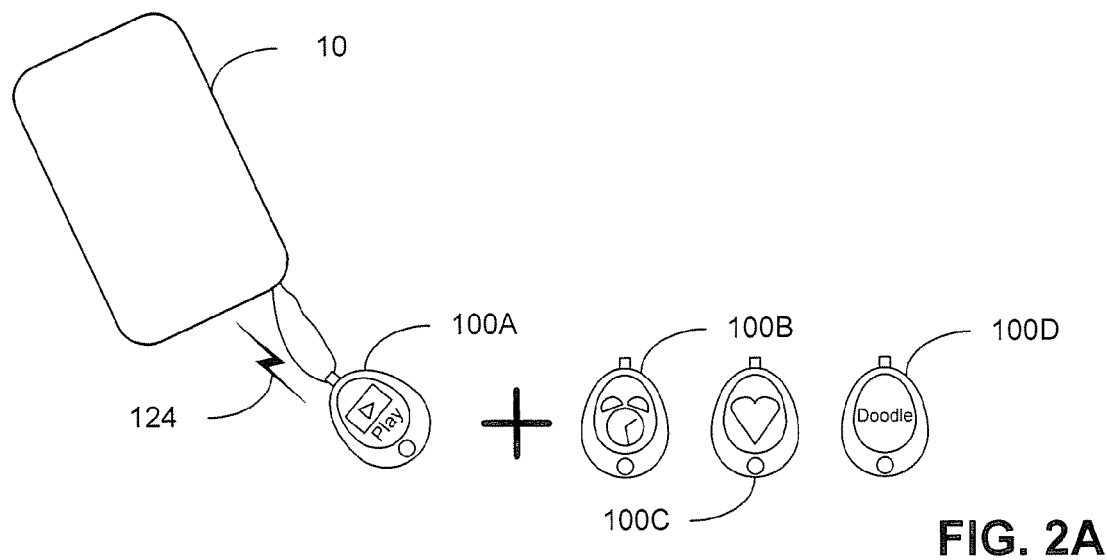
FIGS. 2A and 2B are a front view of a mobile terminal with a first external input device connected with other external input devices before the connection thereof and after the connection thereof, respectively, according to some embodiments of the present invention.
Figure 2B:
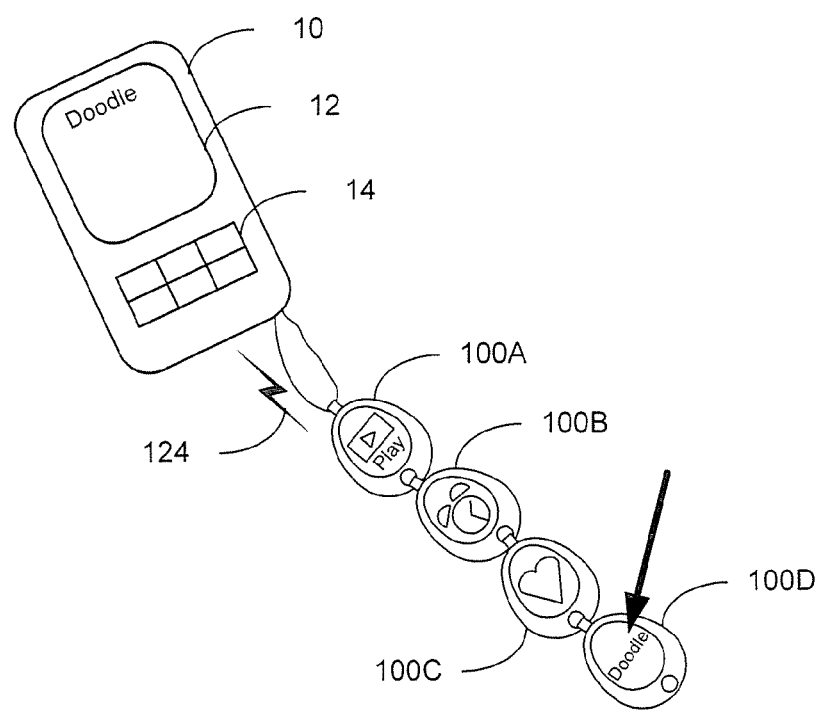

Reference is now made to FIGS. 2A and 2B, which are front views of a mobile terminal with a first external input device connected and other external input devices before the connection thereof and after the connection thereof, respectively, according to some embodiments of the present invention. Referring to FIG. 2A, an external input device 100A is attached to a mobile terminal 10. The external input device 100A may correspond, for example, to a PLAY function in the mobile terminal 10. Activation of the PLAY function in the mobile terminal 10 may be communicated via a wireless communication link 124 therebetween. As illustrated, external input devices 100B, 100C and 100D, that correspond to other respective functions in the mobile terminal 10 may be available. For example, some embodiments provide that a mobile terminal includes functional applications 14 that may be selectively accessed, executed and/or otherwise carried-out (e.g., by a microprocessor and/or discrete logic circuitry) in response to receiving a corresponding activating input.

Although not illustrated, a mobile terminal 10 may include user input/output hardware and associated executable and/or compilable code for using the hardware. In some embodiments, user input/output hardware may include a display, speaker(s), keys, buttons, dials, switches, touch interfaces and/or microphone(s), among others. Additionally, a mobile terminal 10 may include one or more transmitters, receivers and/or transceivers that are configured to send and/or receive communications via one or more communications networks. A mobile terminal 10 may include a processor for executing various terminal functions, an on-board power source, such as, for example, a battery, and/or a transmission/reception element such as, for example, an antenna, among others.

Reference is made to FIG. 2B, which illustrates the external input devices 100B, 100C and 100D that are attached to the mobile terminal via external input device 100A. As indicated by the arrow, if external input device 100D corresponding to a "Doodle" application is engaged by the user, the "Doodle" application is initiated, executed and/or resumed in the mobile terminal 10. In this manner, a user may attach multiple external input devices 100A-D that correspond to favorite and/or frequently accessed functions in the mobile terminal 10 to provide convenient and rapid access to those functions.

Figure 3A:
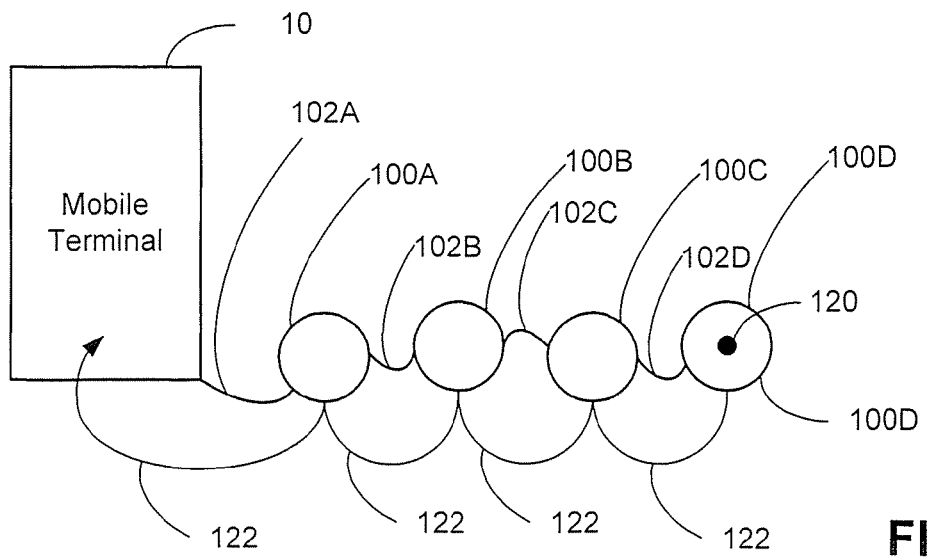
FIGS. 3A-3E are block diagrams a mobile terminal and a plurality of external input devices according to some exemplary embodiments of the present invention.

Reference is now made to FIGS. 3A-3E, which are block diagrams a mobile terminal and a plurality of external input devices according to some exemplary embodiments of the present invention. Referring to FIG. 3A, external input devices 100A-100D are attached to the mobile terminal 10 in a serial arrangement. That is, external input device 100A is attached to the mobile terminal 10 via first fastening component 102A, external input device 100B is attached to external input device 100A via first fastening component 102B and second fastening component 108A (not shown here), etc. External input devices 100C and 100D may be similarly attached to form a "chain" of external input devices 100A-D that may each be configured to provide a shortcut to a different function in the mobile terminal 10.

In FIG. 3A, the fastening components 102 are illustrated as solid lines, which represent that the external input devices 100 and the mobile terminal 10 are communicatively coupled via a conductive element within and/or accompanying the fastening component 102. In this regard, some embodiments provide that the activation signal origination 120 that occurs in external input device 100D follows an electrically conductive signal path 122 from external input device 100D to device 100C, to device 100B, to device 100A and then to the mobile terminal 10, where the function within the mobile terminal 10 corresponding to external input device 100D may be activated. In this manner, some embodiments provide that external input device 100A operates as a master and/or hub and is the only one of the external input devices 100A-D that directly communicates with the mobile terminal 10.

Figure 3B:
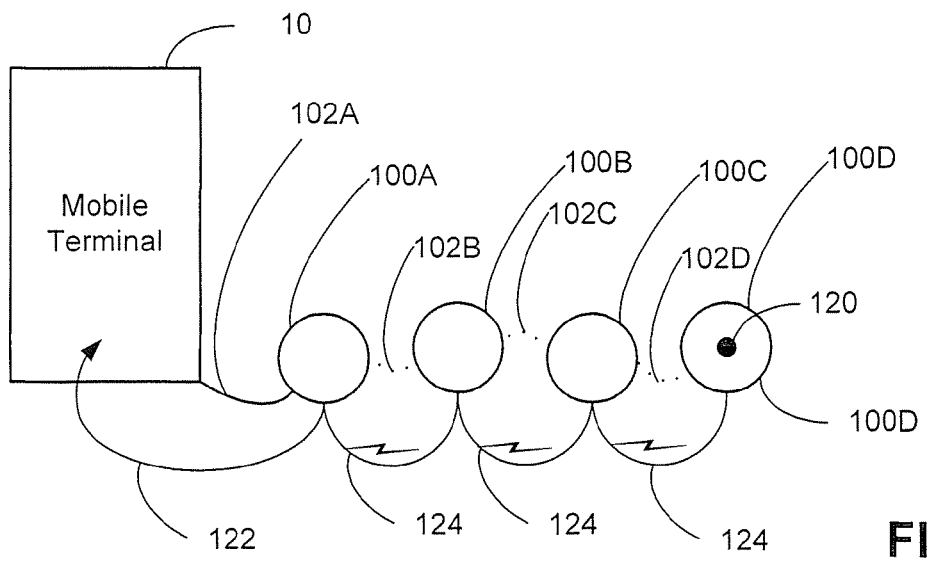

Referring to FIG. 3B, some embodiments may include a combination of electrically conductive signal paths 122 and wireless signal paths 124. For example, some embodiments provide that ones of the fastening components 102 are illustrated as dotted lines, which represent that the respective devices are communicatively coupled via a wireless communication link. In some embodiments, as illustrated in FIG. 3B, the external input devices 100 and/or the mobile terminal 10 are communicatively coupled via a wireless communication link. For example, some embodiments provide that the activation signal origination 120 that occurs in external input device 100D follows wireless signal path 124 from external input device 100D to device 100C, to device 100B, to device 100A and then follows an electrically conductive signal path 122 to the mobile terminal 10, where the function in the mobile terminal 10 corresponding to external input device 100D may be activated. In this manner, some embodiments provide that external input device 100A communicates with other ones of the external input devices 100B-D via wireless communication while maintaining an electrically conductive communication with the mobile terminal 10.

Figure 3C:
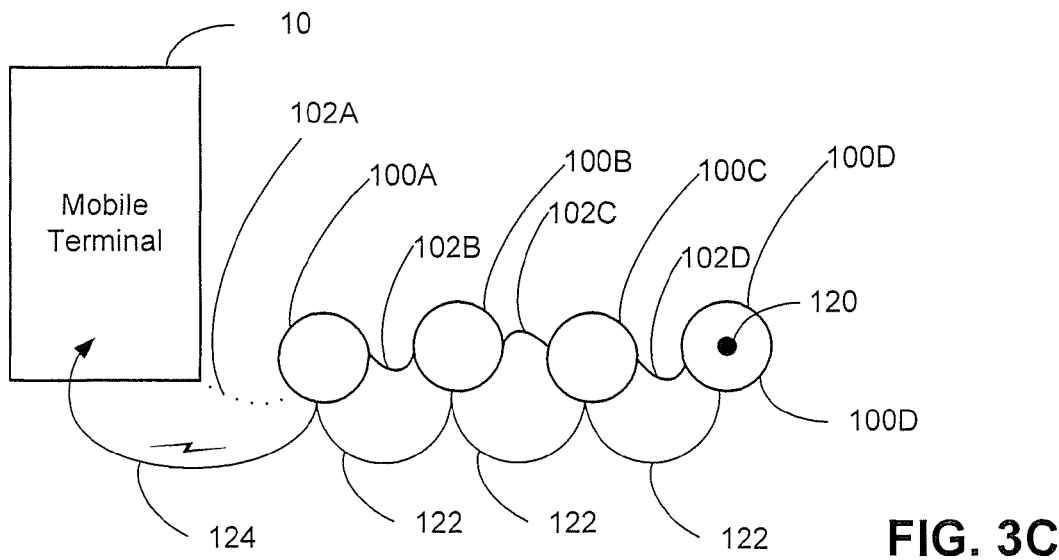

Referring to FIG. 3C, some embodiments may provide other combinations of electrically conductive signal paths 122 and wireless signal paths 124. For example, some embodiments provide that the activation signal origination 120 that occurs in external input device 100D follows an electrically conductive signal path 122 from external input device 100D to device 100C, to device 100B, to device 100A and then follows a wireless signal path 124 to the mobile terminal 10, where the function in the mobile terminal 10 corresponding to external input device 100D may be activated. In this manner, some embodiments provide that external input device 100A communicates with other ones of the external input devices 100B-D via an electrically conductive communication while using a wireless conductive link to communicate with the mobile terminal 10.

Figure 3D:
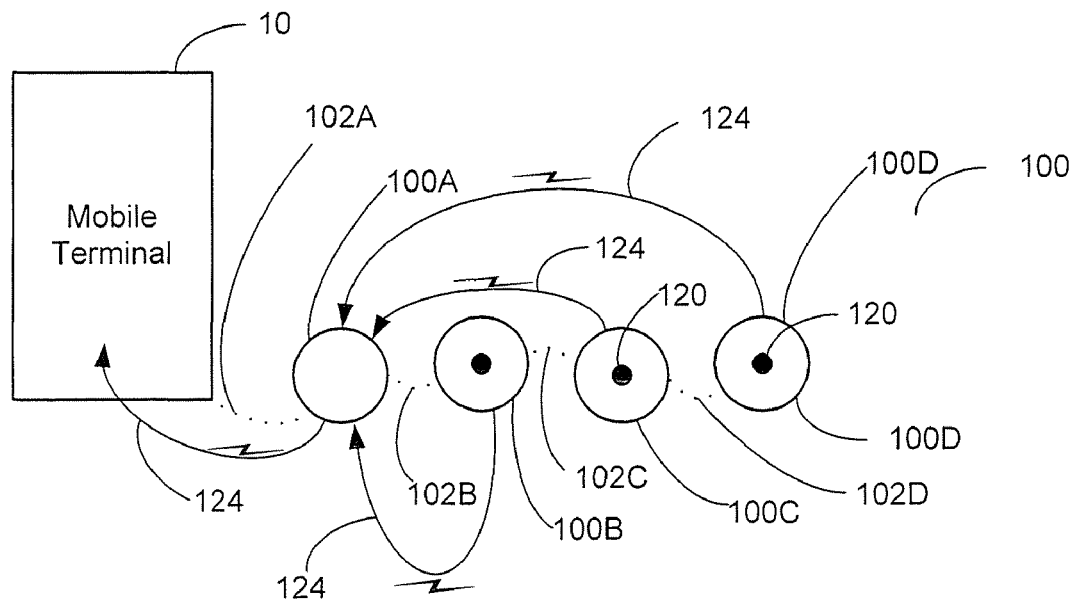

Referring to FIG. 3D, some embodiments may provide that the external input devices are communicatively arranged in a parallel configuration versus a serial configuration. In some embodiments, a parallel configuration of the external input devices 100A-D may be configured to operate using a master and/or hub arrangement such that one of the external input devices 100A may operate as a master and/or hub. For example, some embodiments provide that activation signal originations 120 that occur in external input devices 100B-D may be wirelessly transmitted via wireless signal paths 124 to external input device 100A. The activation signals from external input devices 100A-D may then be transmitted to the mobile terminal 10 via wireless signal path 124 from external input device 100A acting as a hub and/or master.

Figure 3E:
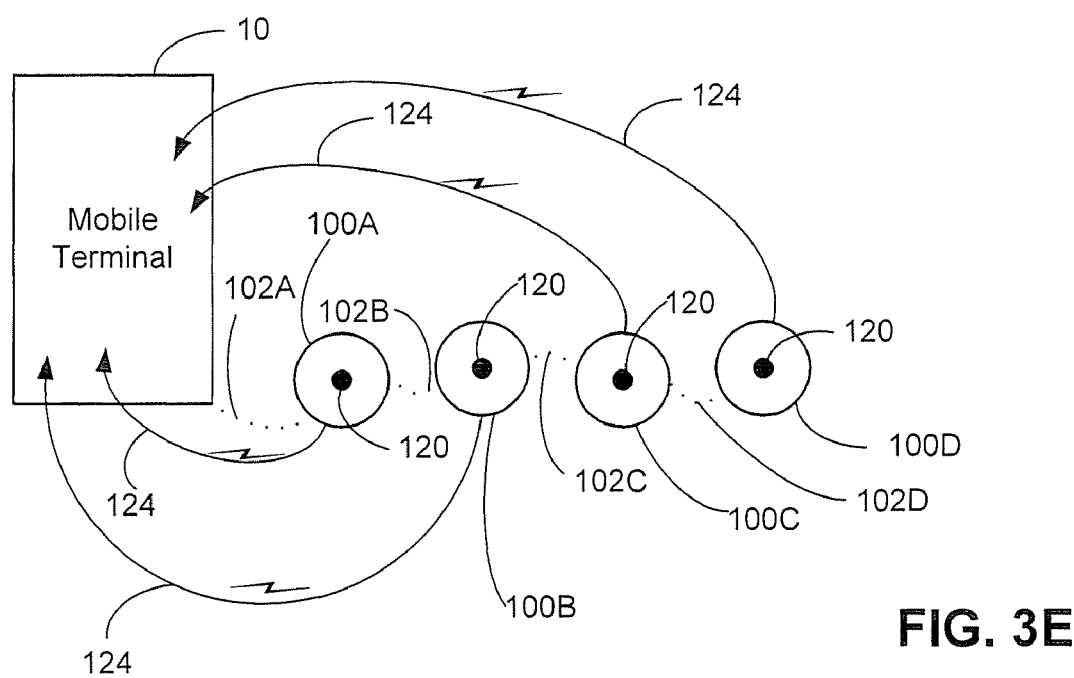

Referring to FIG. 3E, some embodiments of a parallel configuration may provide that activation signal originations 120 that occur in external input devices 100A-D are communicated directly from the respective external input devices 100A-D to the mobile terminal 10. For example, wireless signal paths 124 may communicate the activation signals from each external input device 100A-D directly to the mobile terminal 10.

Figure 4:
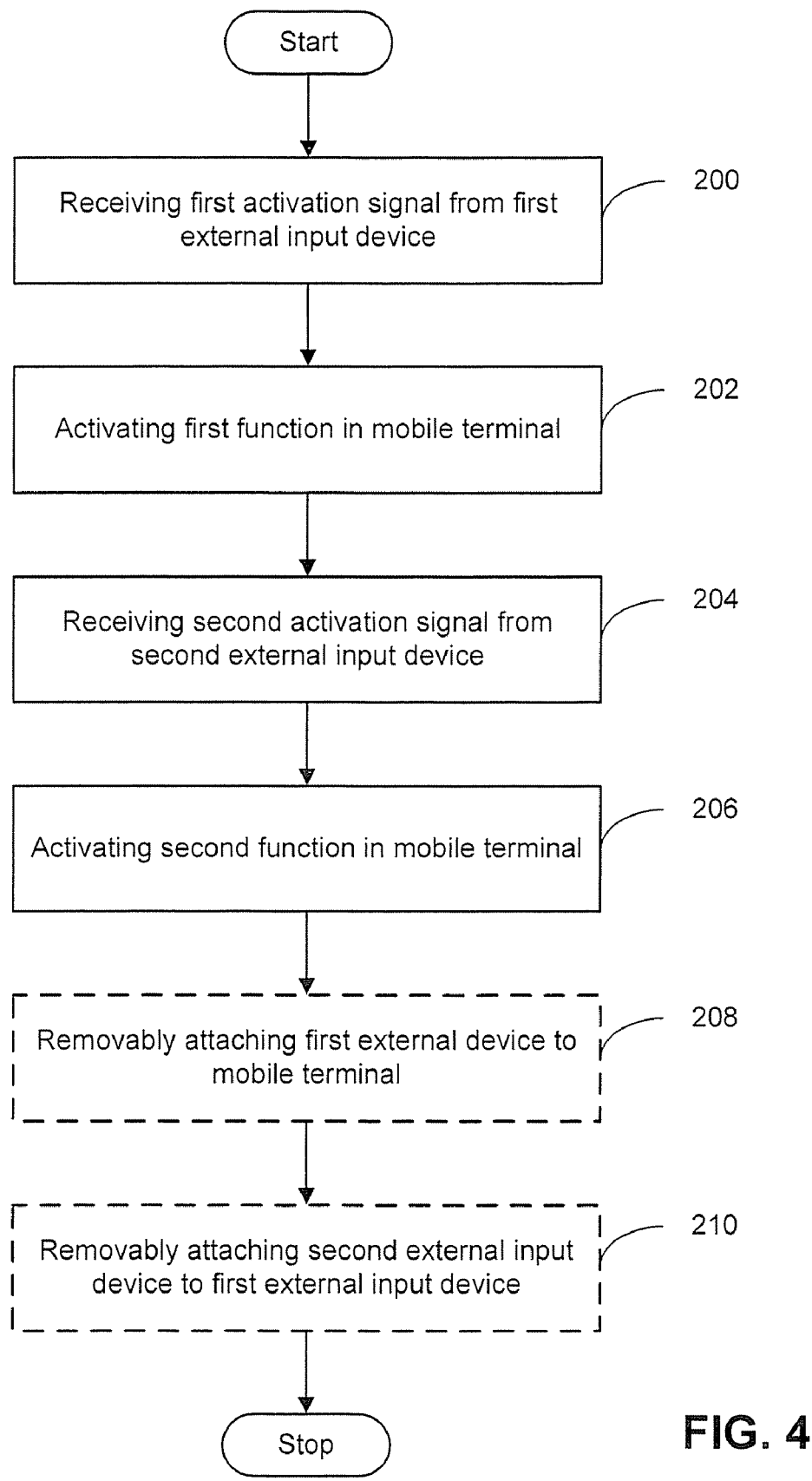
FIG. 4 is a flowchart illustrating operations according to some embodiments of the present invention.

Reference is now made to FIG. 4, which is a flowchart illustrating operations according to some embodiments of the present invention. Operations may include receiving, into the mobile terminal, a first activation signal from a first external input device (block 200). The first activation signal may correspond to a first function in the mobile terminal. The mobile terminal may activate the first function responsive to receiving the first activation signal (block 202).

Operations may include receiving, into the mobile terminal, a second activation signal from a second external input device (block 204). The second activation signal may correspond to a second function in the mobile terminal. The mobile terminal may activate the second function responsive to receiving the second activation signal (block 206).

Some embodiments provide that exemplary first and second functions in the mobile terminal may include initiating, executing and/or resuming specific applications and/or initiating specific communication types and/or destinations, among others. In some embodiments, applications may include web browsers, media players, games, and/or hardware specific drivers, among others. For example, the first function may correspond to a play function in a media player application in the mobile terminal. In this regard, when the first activation signal from the first external input device is received into the mobile terminal, the media player application in the mobile terminal may initiate and/or resume. In this manner, a user may be provided an easy to access input to start and/or resume the media play function in the mobile terminal.

In contrast, for example, the second function in the mobile terminal may correspond to opening a communication interface to a specific party. For example, the second function may initiate a call to a specific friend and/or family member. In some embodiments, the function may correspond to a text message interface, among others. In this manner, a user may be provided with multiple external input devices that, when actuated, may cause the mobile terminal to activate respective corresponding functions.

In some embodiments, operations may include removably attaching the first external input device to the mobile terminal via a first mechanical connection (block 208). In some embodiments, the first mechanical connection may include a communication component that is configured to transmit the first activation signal from the first external input device to the mobile terminal. Some embodiments provide that the communication component includes a conductive element that is operative to provide an electrically conductive path between the first external input device and the mobile terminal. In some embodiments, the communication component may include a non-conductive component to provide wireless communication between the first external input device and the mobile terminal.

Operations according to some embodiments may include removably attaching the second external input device to the first external input device via a second mechanical connection (block 210). In some embodiments, the second mechanical connection may include a communication component that is configured to transmit the second activation signal from the second external input device to the mobile terminal via the first external input device.

In some embodiments, the first activation signal may be wirelessly received into the mobile terminal from the first external input device. Some embodiments provide that the second activation signal may be received into the first external input device from the second external input device and into the mobile terminal from the first external input device. In some embodiments, the second activation signal is conductively received into the first external device from the second external input device. Some embodiments provide that the second activation signal is wirelessly received into the first external device from the second external input device. In some embodiments, the second activation signal is wirelessly received into the mobile terminal directly from the second external input device.

Some embodiments include receiving a third activation signal into the mobile terminal from a third external input device. The third activation signal may correspond to a third function in the mobile terminal, which may be activated responsive to receipt of the third activation signal.

In some embodiments, multiple ones of the external input devices may be serially connected with one another to form a chain and/or fob, among others. In some embodiments, the one or more external input devices may be physically attached to the mobile terminal. Some embodiments provide that one or more of the external input devices may be unattached to the mobile terminal and may be accessed and/or actuated independent of the mobile terminal. In some embodiments, multiple ones of the external devices may be connected to one another to form a loop that may, for example, be attached to a purse, garment, backpack and/or worn on the person of a user, among others. In this manner, a function of the mobile terminal may be activated without accessing and/or retrieving the mobile terminal from a case and/or carrier. For example, an external input device corresponding to a PLAY function in a media player may be actuated to cause the mobile terminal to play a song that may be delivered to the user via a speaker such as, for example, may be typically included in a personal listening device.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus for activating a first function in a mobile terminal, the apparatus comprising:
   a user input component that corresponds to the first function in the mobile terminal and that is configured to receive an activating input from a user;
   a first communication component that is configured to send a first activation signal to the mobile terminal in response to the activating input from the user that corresponds to the first function in the mobile terminal and that causes the mobile terminal to activate the first function;
   a first fastening component that is configured to engage the mobile terminal and to removably attach the apparatus to the mobile terminal; and
   a second fastening component that is configured to engage a first fastening component of a second apparatus that is configured to activate a second function in the mobile terminal that is different from the first function in the mobile terminal, the second fastening apparatus further configured to removably attach the apparatus to the second apparatus.

2. The apparatus according to claim 1, further comprising:
   a second apparatus that is removably attached to the first apparatus via the first and second fastening components on the first apparatus and the second apparatus, respectively; and
   a third apparatus that is removably attached to the second apparatus via the first and second fastening components on the second apparatus and the third apparatus, respectively.

3. The apparatus according to claim 1, wherein the first communication component comprises a conductive element that is configured to transmit an electrical signal from the apparatus to the mobile terminal.

4. The apparatus according to claim 3, wherein the conductive element and the first fastening component are integrally configured, wherein when the first fastening component is engaged with the mobile terminal, the apparatus and the mobile terminal are conductively engaged.

5. The apparatus according to claim 1, wherein the first communication component comprises a wireless communication component that is configured to wirelessly send the first activation signal to the mobile terminal that corresponds to the first function in the mobile terminal and that causes the mobile terminal to activate the first function.

6. The apparatus according to claim 1, further comprising a second communication component that is configured to receive a second activation signal from the second apparatus that corresponds to the second function in the mobile terminal, wherein the first communication component is further configured to send the second activation signal to the mobile terminal.

7. The apparatus according to claim 6, wherein the second communication component comprises a conductive element that is configured to receive an electrical signal from the second apparatus.

8. The apparatus according to claim 6, wherein the second communication component comprises a wireless communication component that is configured to wirelessly receive the second activation signal from the second apparatus.

9. The apparatus according to claim 1, wherein the user input component comprises a physical activator that can be engaged by a user.

10. The apparatus according to claim 1, wherein the user input component comprises a touch technology that can be actuated by positioning the apparatus in close proximity with the mobile terminal.

11. The apparatus according to claim 1, further comprising an image display component that is configured to provide a first function image that is associated with the first function.

12. A method of providing customizable interaction with a mobile terminal using a plurality of external input devices, the method comprising:
   receiving, into the mobile terminal, a first activation signal that corresponds to a first function in the mobile terminal from a first external input device of the plurality of input devices that is removably attached to the mobile terminal and is configured to receive a first activating input from a user;
   activating the first function in the mobile terminal responsive to receiving the first activation signal;
   receiving, into the mobile terminal, a second activation signal that corresponds to a second function in the mobile terminal from a second external input device of the plurality of external input devices that is removably attached to the first external input device and is configured to receive a second activating input from the user; and
   activating the second function in the mobile terminal responsive to receiving the second activation signal.

13. The method according to claim 12, further comprising:
   removably attaching the first external input device to the mobile terminal via a first mechanical connection; and
   removably attaching the second external input device to the first external input device via a second mechanical connection.

14. The method according to claim 13, wherein the first mechanical connection comprises a first communication component that is configured to transmit the first activation signal from the first external input device to the mobile terminal, and
   wherein the second mechanical connection comprises a second communication component that is configured to transmit the second activation signal from the second external input device to the mobile terminal via the first external input device.

15. The method according to claim 12, wherein receiving, into the mobile terminal, the first activation signal comprises wirelessly receiving the first activation signal from the first external input device.

16. The method according to claim 15, wherein receiving, into the mobile terminal, the second activation signal comprises:
   receiving, into the first external input device, the second activation signal from the second external input device; and
   wirelessly receiving, into the mobile terminal, the second activation signal from the first external input device.

17. The method according to claim 16, wherein receiving, into the first external input device, the second activation signal comprises conductively receiving, into the first external input device, the second activation signal from the second external input device.

18. The method according to claim 16, wherein receiving, into the first external input device, the second activation signal comprises wirelessly receiving, into the first external input device, the second activation signal from the second external input device.

19. The method according to claim 15, wherein receiving, into the mobile terminal, the second activation signal comprises wirelessly receiving, into the mobile terminal, the second activation signal from the second external input device.

20. A system for providing customizable interaction with a mobile terminal, the system comprising:
- a plurality of external input devices that correspond to a respective plurality of functions in the mobile terminal, the plurality of external input devices configured to transmit a respective plurality of activation signals to be received by the mobile terminal, the plurality of external input devices configured to be arranged in a serial arrangement that is removably attached to the mobile terminal, and the plurality of external input devices are communicatively coupled to one another and/or the mobile terminal;

wherein respective ones of the plurality of external input devices comprise:
- a user input component that corresponds to a respective function in the mobile terminal and that is configured to receive an activating input from a user;
- a communication component that is configured to send a respective activation signal to the mobile terminal that corresponds to the respective function in the mobile terminal and that causes the mobile terminal to activate the respective function;
- a first fastening component that is configured to engage the mobile terminal and/or another one of the plurality of external input devices and to removably attach the apparatus to the mobile terminal and/or the other of the plurality of external input devices; and
- a second fastening component that is configured to engage a first fastening component of another one of the plurality of external input devices.

* * * * *